US008402541B2

(12) United States Patent
Craioveanu et al.

(10) Patent No.: US 8,402,541 B2
(45) Date of Patent: Mar. 19, 2013

(54) PROACTIVE EXPLOIT DETECTION

(75) Inventors: Cristian Craioveanu, Redmond, WA (US); Ying Lin, Redmond, WA (US); Peter Ferrie, Redmond, WA (US); Bruce Dang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 12/402,861

(22) Filed: Mar. 12, 2009

(65) Prior Publication Data
US 2010/0235913 A1 Sep. 16, 2010

(51) Int. Cl.
G06F 21/00 (2006.01)
(52) U.S. Cl. ............... 726/23; 726/22; 726/24; 726/25; 726/26; 726/27; 712/233; 713/188
(58) Field of Classification Search ............... 726/22–27
See application file for complete search history.

(56) References Cited

U.S. PATENT DOCUMENTS

| | | | | |
|---|---|---|---|---|
| 5,974,543 | A * | 10/1999 | Hilgendorf et al. | 712/240 |
| 7,730,542 | B2 * | 6/2010 | Cronce et al. | 726/26 |
| 8,141,163 | B2 * | 3/2012 | Pike | 726/26 |
| 8,176,477 | B2 * | 5/2012 | Wu | 717/138 |
| 8,281,398 | B2 * | 10/2012 | Ness et al. | 726/23 |
| 8,307,432 | B1 * | 11/2012 | Feng | 726/22 |
| 2003/0154399 | A1 * | 8/2003 | Zuk et al. | 713/201 |
| 2003/0212913 | A1 * | 11/2003 | Vella | 713/202 |
| 2005/0223238 | A1 * | 10/2005 | Schmid et al. | 713/188 |
| 2005/0283838 | A1 * | 12/2005 | Saito | 726/24 |
| 2006/0026682 | A1 | 2/2006 | Zakas | |
| 2007/0089171 | A1 * | 4/2007 | Aharon et al. | 726/22 |
| 2007/0094734 | A1 * | 4/2007 | Mangione-Smith et al. | 726/24 |
| 2007/0208822 | A1 | 9/2007 | Wang et al. | |
| 2008/0010538 | A1 * | 1/2008 | Satish et al. | 714/38 |
| 2008/0022405 | A1 | 1/2008 | Wang et al. | |
| 2008/0184367 | A1 * | 7/2008 | McMillan et al. | 726/23 |
| 2008/0209562 | A1 * | 8/2008 | Szor | 726/24 |
| 2008/0262991 | A1 | 10/2008 | Kapoor et al. | |
| 2009/0077544 | A1 * | 3/2009 | Wu | 717/160 |
| 2009/0328185 | A1 * | 12/2009 | Berg et al. | 726/13 |
| 2009/0328232 | A1 * | 12/2009 | Safford, III | 726/26 |
| 2010/0031359 | A1 * | 2/2010 | Alme | 726/24 |

(Continued)

OTHER PUBLICATIONS

"L," IEEE Std 100-2000 , vol., no., 2000, pp. 640 doi: 10.1109/IEEESTD.2000.322243 URL: http://ieeexplore.ieee.org/stamp/stamp.jsp?tp=&arnumber=4116800&isnumber=4116786.*

(Continued)

Primary Examiner — Philip Chea
Assistant Examiner — Dorianne Alvarado David

(57) ABSTRACT

Malware detection systems and methods for determining whether a collection of data not expected to include executable code is suspected of containing malicious executable code. In some embodiments, a malware detection system may disassemble a collection of data to obtain a sequence of possible instructions and determine whether the collection of data is suspected of containing malicious executable code based, at least partially, on an analysis of the sequence of possible instructions. In one embodiment, the analysis of the sequence of possible instructions may comprise determining whether the sequence of possible instructions comprises an execution loop. In a further embodiment, a control flow of the sequence of possible instructions may be analyzed. In a further embodiment, the analysis of the sequence of possible instructions may comprise assigning a weight that is indicative of a level of suspiciousness of the sequence of possible instructions. In a further embodiment, the sequence of possible instructions may begin with a possible instruction that comprises at least one candidate operation code (opcode) that has been determined to occur frequently in executable code.

19 Claims, 8 Drawing Sheets

U.S. PATENT DOCUMENTS

2010/0058473 A1* 3/2010 Breitenbacher ............... 726/23
2010/0162400 A1* 6/2010 Feeney et al. ................. 726/24
2010/0175133 A1* 7/2010 Ness et al. .................... 726/23
2010/0205674 A1* 8/2010 Zorn et al. .................... 726/25

OTHER PUBLICATIONS

X-Force Research and Development Newsletter, http://www.iss.net/docurnents/literature/X-ForceNews_Sep06.pdf , published Sep. 2006, downloaded Dec. 12, 2008.

Analyst's Diary, http://www.viruslist.com/en/weblog? calendar=2006-05, downloaded Dec. 12, 2008.

Zero-day threat targets Microsoft word, http://searchsecurity.techtarget.com/news/article/0,289142,sid14_gci1189346,00.html# , downloaded Dec. 12, 2008.

Microsoft word zero-day attack discovered, http://www.eweek.com/c/a/Security/Microsoft-Word-ZeroDay-Attack-Discovered/, downloaded Dec. 12, 2008.

Microsoft object linking and embedding (OLE) automation heap based buffer overflow vulnerability, http://www.juniper.net/security/auto/vulnerabilities/vuln27661.html, downloaded Dec. 12, 2008.

* cited by examiner

PROACTIVE EXPLOIT DETECTION

BACKGROUND

Many computer system are vulnerable to attacks by an attacker that cause the computer systems to behave in unexpected ways, often with undesirable outcomes. For example, a successful attack may allow an attacker to gain illegitimate access to data, to flood a computer system with bogus requests so that legitimate users are prevented from utilizing system resources, to gain full control of the computer system, etc. Such attacks can lead to extended service interruptions and/or compromise of critical data, which can result in economic losses for businesses, damages to the information technology infrastructure and/or inconvenience to the users.

Vulnerabilities can exist on different parts of a computer system, including software applications, operating systems, firmware and/or hardware. When a vulnerability is discovered, a provider of the vulnerable component often develops a patch (also known as an update) to remove the vulnerability. The patch is then made available to users for download and installation. However, there is often a window between the points in time when the vulnerability is discovered and when the patch becomes available. During this time window, computer systems having the vulnerable component remain susceptible to the so-called "zero-day" attacks, that is, those attacks that target unknown vulnerabilities or newly disclosed vulnerabilities for which patches are not yet released.

Attack prevention techniques have been employed that seek to detect malicious software, or "malware," and to prevent it from being executed on a target system. For example, some attacks have been carried out by embedding malicious executable instructions into text, image, audio or video files. The malicious instructions are executed when a user unwittingly allows a vulnerable application to load the data file, which triggers the attack and allows the attacker unintended access to the target system.

One way of protecting the target system against malware attacks is to scan incoming data files for malware before the files are loaded by any applications. Conventionally, this type of scanning is performed by an anti-malware program that maintains a list of specific patterns, or "signatures," associated with known malware. During a scan, the anti-malware program looks for these patterns and declares the data file to be potentially malicious if one or more of the patterns are found. The list of known patterns is updated periodically, for example, by communicating with an anti-malware server that publishes new malware reports.

SUMMARY

Applicants have recognized that conventional techniques for detecting malware by relying on a list of known malware signatures are limited in that they can only detect those attacks whose signatures are present in the list of known patterns, and because they are relatively ineffective against polymorphic attacks where malicious code may mutate constantly. Thus, in some embodiments, techniques are employed that seek to detect malicious executable code in data collections (e.g., files) where they do not belong, but not by being limited to searching for known attacks. Rather, some embodiments seek to detect any executable code.

Applicants have further recognized that bit patterns matching those of executable code may coincidentally appear in innocuous data files that are not malicious. Detecting such a file as suspicious would be a false positive detection (that is, reporting a file to be potentially malicious while the file does not in fact contain any malicious code). Applicants have appreciated that a high rate of false positive errors may cause inconvenience, discourage use of the system or perhaps even make the system impractical for use. Thus, in some embodiments, techniques are employed to minimize false positives.

For example, in some embodiments, bit patterns appearing to be multiple machine instructions are analyzed collectively and in relation to each other, as opposed to a bit pattern matching each machine instruction being analyzed in isolation, as this may reduce false positives that may occur by coincidental pattern matching for a single instruction.

In accordance with some embodiments of the invention, a malware detection system is provided that determines whether a collection of data not expected to include executable code is suspected of containing malicious executable code. The malware detection system may disassemble a collection of data to obtain a sequence of possible instructions and determine whether the collection of data is suspected of containing malicious executable code based, at least partially, on an analysis of the sequence of possible instructions.

In some embodiments, the analysis of the sequence of possible instructions may comprise determining whether the sequence of possible instructions comprises an execution loop. Applicants have appreciated that a loop structure may be detected in the malicious code, even in the case of a polymorphic attack. In addition, Applicants have appreciated that a file containing raw data is unlikely to exhibit a loop structure, therefore using loop detection as a way to detect malware is unlikely to produce a high rate of false positives.

In some further embodiments, an execution loop may be detected at least partially by analyzing a control flow of the sequence of possible instructions, recording a location for at least one of the possible instructions in the sequence, and determining whether the control flow of the sequence of possible instructions returns to the location for the at least one of the possible instructions in the sequence.

In some further embodiments, analyzing a control flow of the sequence of possible instructions may comprise, for a first possible instruction of the sequence of possible instructions, determining a location of a next possible instruction in the sequence of possible instructions at least partially by analyzing the first possible instruction. When the first possible instruction is a branch instruction, a target of the branch instruction may be analyzed as the next possible instruction. When the first possible instruction is not a branch instruction, a possible instruction consecutively following the first possible instruction in the collection of data may be analyzed as the next possible instruction.

In some further embodiments, the analysis of the sequence of possible instructions may comprise assigning a weight that is indicative of a level of suspiciousness of the sequence of possible instructions. The weight may be adjusted depending on certain patterns being present or absent in the sequence of possible instructions. When the weight exceeds a threshold, the collection of data may be reported as being suspected of containing malicious executable code.

Some embodiments are designed for use in applications where only a limited amount of time is available for analyzing the entire data files, so that it is desirable to maximize the speed of the analysis without unduly sacrificing accuracy. In some embodiments, the sequence of possible instructions may begin with a possible instruction that comprises at least one candidate operation code (opoode) that has been determined to occur frequently in executable code, so that time is not spent analyzing portions of data files unless they contain particular opcodes that frequently occur in executable code.

DETAILED DESCRIPTION

Figure 1:
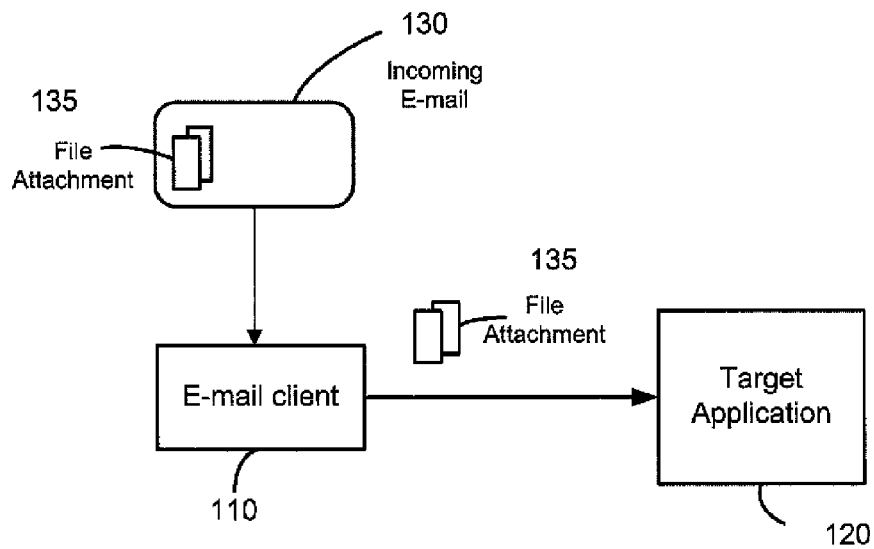
FIG. 1 illustrates an exemplary scenario in which malicious code embedded in a data file may become executed on a target computer system.

Applicants have recognized that conventional techniques for detecting malware in data files have some deficiencies. For example, by relying on a list of known malware signatures, only those attacks whose signatures are present in the list of known patterns can be detected. Therefore, a conventional malware scanner does not provide any protection against an unknown or newly deployed attack, until the attack has been identified and the list of known patterns has been updated to include its signature. This delay can range from several hours to several days, during which time computer systems are vulnerable to the malware.

The conventional approach also has reduced effectiveness against polymorphic attacks. A polymorphic attack involves malicious code that mutates regularly without changing its algorithmic functionality. For example, when one copy of the malicious code is executed on a target system, it creates different copies of the malicious code to be transmitted to other target systems. These copies are different in form (e.g., they may appear to be different bit strings), but they are capable of carrying out the same attack once they make their way to the other target systems. Due to these constant mutations, a conventional malware scanner may have difficulty in isolating patterns that can be used to detect the malicious code.

The conventional approach also requires frequent updates. As discussed above, a conventional malware scanner does not provide protection against a new attack until it receives an update with the signature of the new attack. Therefore, the time window between consecutive updates should be small enough to minimize the probability of being attacked successfully between updates. These frequent updates add a burden and cost to system administration.

In accordance with one embodiment of the invention, a malware detection system is provided that searches for machine executable code in data files that are not expected to contain executable code, so that the presence of executable code in such a file is suspicious. In some embodiments, when bit patterns matching executable code is found in a data file, the file may be further analyzed to determine a level of suspiciousness. In some embodiments, the heuristics used to select and analyze the executable code may be generic, in the sense that they are not targeted to any specific classes of attacks. For example, the system may not rely on knowledge of prior attack signatures. Thus, unlike a conventional malware scanner, such an embodiment can detect even zero-day attacks and does not rely on frequent updates of known attacks to maintain its effectiveness.

In a further embodiment of the invention, determining a level of suspiciousness of a bit pattern corresponding to executable code found in a data file may comprise detecting an execution loop. Applicants have appreciated that polymorphic attacks are often constructed by embedding in a data file an encrypted version of the malicious code together with a decryption engine, which typically includes machine instructions for carrying out a decryption loop. When executed, the decryption engine decrypts the malicious code and causes the malicious code to execute, thereby unleashing the attack. While the encrypted malicious code may not be recognizable as meaningful machine instructions, the decryption engine is usually unencrypted and recognizable. For example, a loop structure may be detected even if the attack is designed to mutate the decryption engine. Thus, in some embodiments, a determination is made of whether an execution loop is present to facilitate detecting polymorphic attacks.

Applicants have also recognized that bit patterns matching those of executable code may coincidentally appear in innocuous data files that are not malicious. Detecting such a file as suspicious would be a false positive detection (that is, reporting a file to be potentially malicious while the file does not in fact contain any malicious code). Applicants have appreciated that a high rate of false positive errors may cause inconvenience, discourage use of the system or perhaps even make the system impractical for use. Thus, some aspects of the present invention relate to considerations and techniques for examining bit patterns that correspond to executable code to determine which are likely threats and thereby minimize the number of false positives. As one example, Applicants have appreciated that a file containing raw data is unlikely to exhibit a loop structure. Therefore, the aforementioned embodiment using loop detection is unlikely to produce a high rate of false positives.

As another example, Applicants have recognized that the analysis of a data file may yield a more accurate indication of suspiciousness when bit patterns appearing to be multiple machine instructions are analyzed collectively and in relation to each other, as opposed to each bit pattern matching a machine instruction being analyzed in isolation.

This may be accomplished in numerous ways. In one embodiment, a numerical weight may be assigned to a collection of machine instructions found in a data file. The weight may be adjusted depending on certain patterns being present or absent in the collection. When the weight exceeds a threshold, the data file may be reported as being suspicious.

In yet another embodiment, a collection of bit patterns corresponding to machine instructions may be analyzed to determine whether they form a logical sequence of instructions. For example, a collection may be identified as a trace representing a potential sequence of instructions that may be executed when the data file is loaded by an application. To construct the trace, a data stream may be obtained from the data file and disassembled beginning at a bit pattern corresponding to a candidate opcode. A logical flow of the sequence can then be detected based upon the nature of the instructions and whether it branches, loops or transitions to the next sequential instruction inline. Thus, a subsequent instruction to be added to the trace can be determined by analyzing one or more prior instructions that are already in the trace. Each added instruction may represent a logical next instruction to be executed after the execution of the trace constructed thus far.

In this manner, when bit patterns matching one or more executable instructions are detected, her analysis can be performed to determine whether the file includes a sequence of instructions that could perform a meaningful attack. This reduces false positives by determining if bit patterns that appear to match one or more instructions are isolated and incapable of performing a meaningful attack, so that the detected bit patterns are likely innocuous and match those of instructions only coincidentally.

Some embodiments are designed for use in applications where only a limited amount of time is available for analyzing the entire data file, so that it is desirable to maximize the speed of the analysis without unduly sacrificing accuracy. In one embodiment, a trace is recorded only beginning with one or more candidate operation codes (opcodes) that occur frequently in executable programs. Thus, a trace is not recorded where bit patterns matching other opcodes are present, so that time is not spent analyzing traces unless they contain particular opcodes that frequently occur in executable code.

Some illustrative implementations of these and other aspects of the invention are described below. However, it should be appreciated that the aspects of the present invention described herein can be implemented in any suitable way, and are not limited to the specific implementations described below.

FIG. 1 illustrates an exemplary scenario in which malicious code embedded in a data file may, if it goes undetected, be executed on a target computer system. In the exemplary scenario shown, the target computer system may comprise an email client 110 capable of launching one or more application programs. When an incoming email message 130 arrives, the email client 110 extracts, either automatically or upon the user's request, one or more files 135 that are attached to the message 130. The email client 110 may be configured to automatically discern the format of the files 135 and select an application 120 suitable for opening the files 135 (e.g., a word processing application, a media player application, or a photo sharing application, etc.). The email client 110 may then ask for user permission to open the files 135 and, when permission is received, launch the application 120 with the files 135.

When the files 135 are loaded by the application 120, any malicious code that may have been embedded into the files 135 is also loaded into memory. Depending on the vulnerability being exploited and the way in which the malicious code is embedded, this may allow the malicious code to execute, potentially taking control of the application 120 or the entire computer system on which the application 120 is running, or taking some other unauthorized action.

Figure 2:
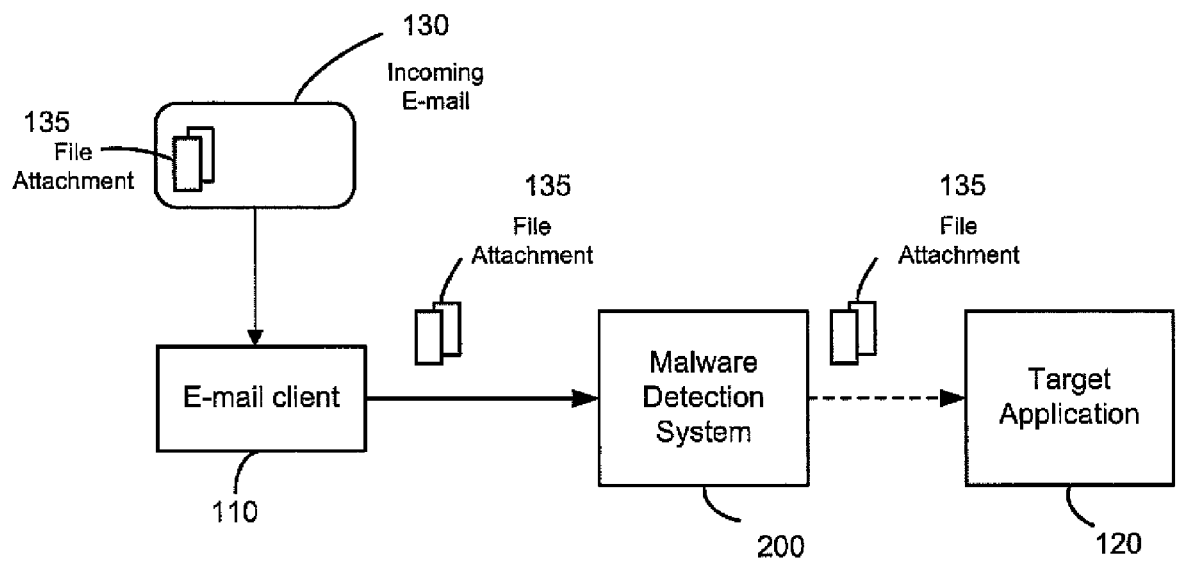
FIG. 2 illustrates the computer system of FIG. 1 with a malware detection system added to analyze data files before they are loaded by an application, in accordance with some embodiments.

To prevent such an attack, in accordance with some embodiments, a malware detection system 200 may be used to analyze the data files 135 before they can take any authorized action. This can be done in any suitable manner, as the aspects of the invention described herein are not limited in this respect. For example, in some embodiments, the data files 135 are analyzed before they are loaded by the application 120, as illustrated in FIG. 2. The malware detection system 200 may receive the data files 135 from the email client 110 and forward them to the application 120 only if and when they are deemed unsuspicious (i.e., unlikely to contain any malicious code). If the data files 135 are deemed to be suspicious, the malware detection system 200 may issue a warning and/or solicit her input from the user before allowing the files to be accessed in a manner that may enable them to take any unauthorized action.

Email is only one of many ways in which data files are transmitted from one computer system to another, and the aspects of the present invention described herein are not limited to analyzing files received via email and may be used to analyze data files from any source (e.g., downloaded via a browser, read from a computer readable medium such as a CD, etc.).

Figure 3:
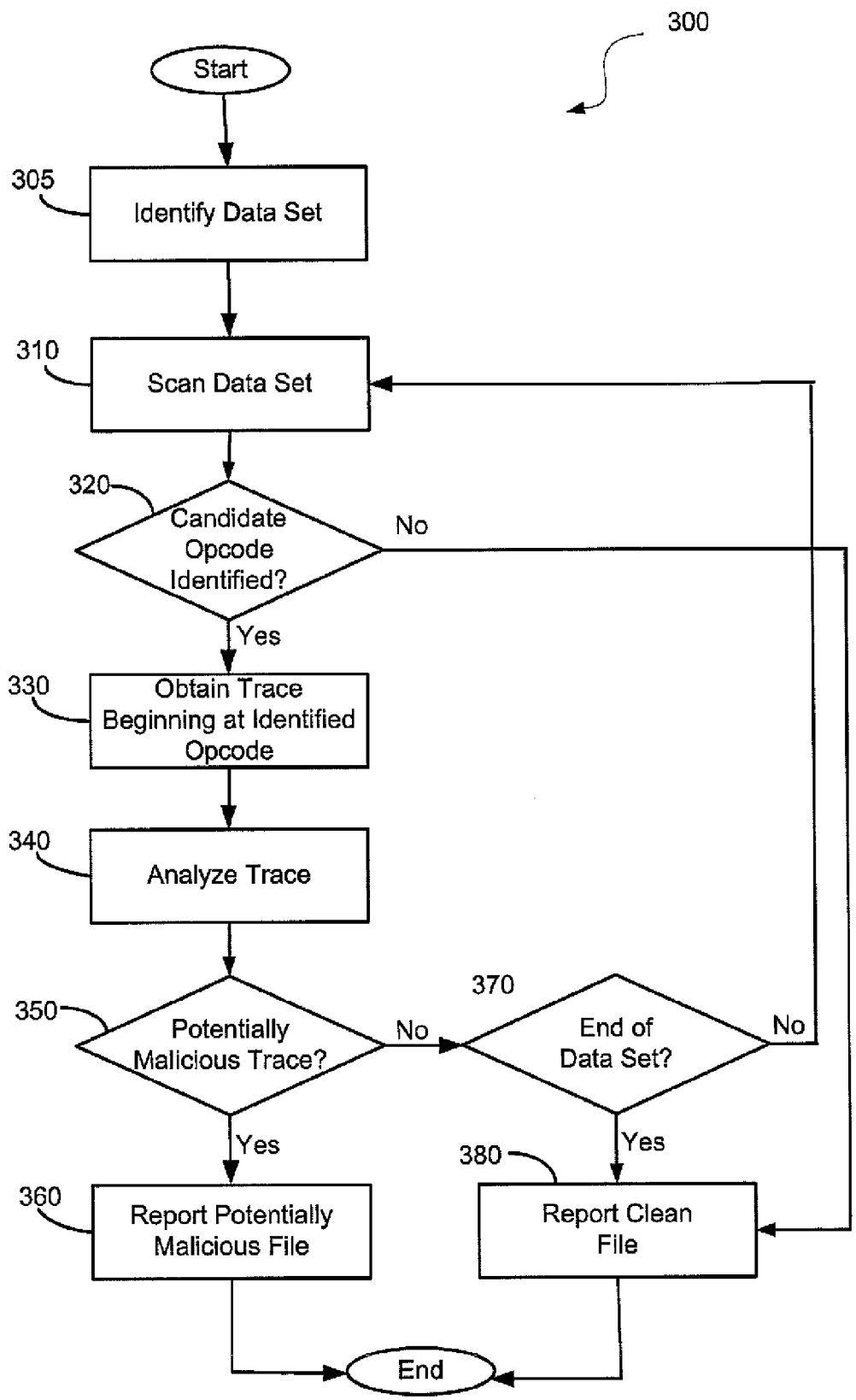
FIG. 3 illustrates an illustrative process that may be executed by the malware detection system to analyze an input data file in accordance with one embodiment.

FIG. 3 illustrates an exemplary process 300 that may be executed by the malware detection system 200 or one or more other system components to analyze an input data file.

First, at act 305, the process 300 identifies a data set to be analyzed. The data set may be identified in any suitable manner by the process 300 or may be provided to it by any other system component. For example, a file may be identified when it arrives at the computer associated with the process 300, when an application attempts to access the file, or at any other time. The data set may be any collection of data. In some examples, the data set is all or any portion of a file. For example, when the input file is of a type associated with a Microsoft Office application (e.g., Word®, Excel®, PowerPoint® or Visio®), the data set may be an Object Linking and Embedding Structured Storage (OLESS) stream embedded in the input file, although these aspects of the invention are not limited in this respect.

In many of the examples described herein the data set is referred to as a file for purposes of illustration. However, it should be appreciated that the aspects of the invention described herein can be used to analyze any data set or collection of data whether contained in a file or not.

Figure 4:
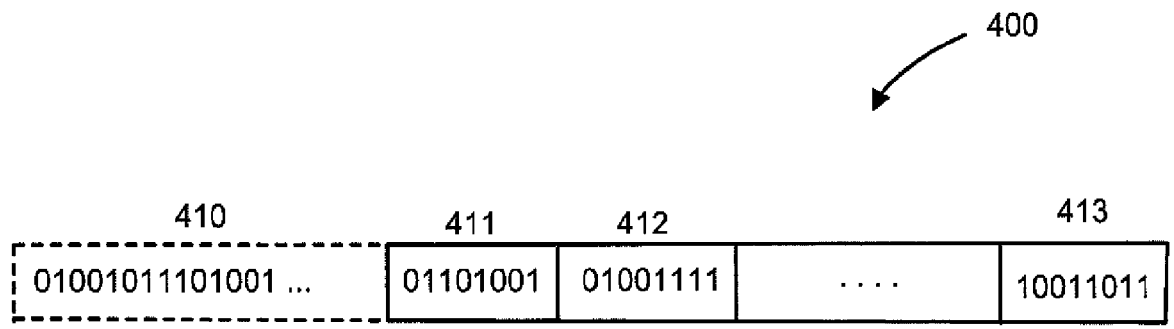
FIG. 4 illustrates a data set as a bit sequence with an initial offset and a sequence of bytes following the initial offset that may be analyzed in accordance with some embodiments to detect malware.

Once the data set has been identified, the process 300 proceeds to analyze it. In some embodiments, the data set may be viewed as a sequence of bits 400, as shown in FIG. 4. The process 300 may analyze the bit sequence 400 by disassembling it into a sequence of bytes: 411, 412, ... 413. Depending on a type or format of the input file, the disassembly may begin at an offset from the beginning of the bit sequence. This offset is represented as block 410 in FIG. 4 and may have any suitable length. For example, an offset of 0x400 may be used for Microsoft Office files. Using such an offset may allow the process 300 to skip over portions of the data set containing metadata, which may contain a description of the structure of the data set and may not be usable by an attacker. This may in turn improve the efficiency of the process 300.

Even when the data sequence is free of malicious code, it is possible that some of the bytes in the above sequence can have the same bit patterns as machine instructions. This is because any data sequence may, by chance, contain bit patterns that correspond to the encodings of machine instructions. For this reason, the mere presence of a bit pattern corresponding to any particular instruction need not be a good indicator that the data sequence contains malicious code. Therefore, in some embodiments, the malware detection system uses one or more heuristics to analyze the data sequence further, rather than to conclude a data sequence is suspicious if it includes bit patterns matching machine instructions. Non-limiting examples of such heuristics are shown in the process 300 in FIG. 3 and others are possible.

Returning to FIG. 3, the process 300 proceeds to scan the data sequence at step 310, possibly beginning at an offset as discussed above. The purpose of the scan is to identify a location within the data sequence where malicious code is most likely to be found. This allows the process 300 to identify portions of the data sequence where further analysis may be warranted, while quickly going over portions that are unlikely to contain malicious code, thereby increasing the speed of the analysis.

In the embodiment of FIG. 3, the process 300 looks for certain opcodes while scanning the data sequence. In one embodiment, the set of candidate opcodes to look for may be those that occur frequently in executable code. As discussed above, scanning for frequent opcodes may allow the process 300 to quickly and reliably identify portions of the data sequence that are most likely to contain executable code. Examples of frequent opcodes may include conditional jumps (0x70-0x7F and 0xE3), unconditional jumps (0xE9 and 0xEB), call (0xE8) and loop (0xE0-0xE2). An illustrative method for identifying frequent opcodes are discussed in greater detail in connection with FIG. 5 below. However, the aspect of the invention that looks for certain opcodes to begin the analysis is not limited in this respect and can look for other opcodes.

If no candidate opcodes are found through the end of the data sequence (at the "no" branch of act 320), then the process 300 may report at act 380 that the input file is clean and may allow it to be loaded by an application, such as the application 120 shown in FIG. 2.

If a candidate opcode is identified (at the "yes" branch of act 320), the process proceeds to act 330 where further analysis is performed beginning at the location of the identified opcode. At act 330, the process 300 constructs a trace (i.e., a sequence of machine instructions) by examining the data sequence beginning at the identified opcode. Illustrative methods for constructing a trace are described in greater detail below in connection with FIGS. 6 and 7. However, it should be appreciated that other suitable methods for constructing a trace may be used, as the invention is not limited in this respect.

When the trace is complete, the process proceeds to act 340 where it is analyzed and a determination is made at act 350 as to whether the trace contains potentially malicious code. Illustrative methods for performing these acts are described in greater detail below in connection with FIGS. 8 and 9. However, it should be appreciated that other suitable methods may also be used.

When it is determined at act 350 that the trace contains potentially malicious code, the process 300 proceeds to act 360 where the input file is reported as being potentially malicious. As discussed above, any additional action may optionally be taken (e.g., generating a report describing the suspicious trace and/or preventing the input file from being loaded by an application until further notice from the user), but the aspects of the invention described herein are not limited in this respect.

When it is determined at act 350 that the trace does not contain potentially malicious code, the process 300 continues to act 370 where a determination is made as to whether the end of the sequence has been reached. This can be done in any suitable manner, e.g., by looking for an end-of-sequence marker. When it is determined at act 370 that the end has not been reached, the process returns to act 310 to continue scanning the sequence for candidate opcodes. When it is determined at act 370 that the end of the data sequence has been reached, process 300 may report at act 380 that the input file is clean. This can be done in any suitable manner, e.g., by generating a summary of the analysis and/or allowing the input file to be loaded by an application, such as the application 120 shown in FIG. 2.

It should be appreciated that the process 300 illustrates merely one illustrative embodiment for analyzing a data sequence to determine whether it may include malicious code. Other embodiments are also possible. In addition, it should be appreciated that the acts described therein can be performed in any suitable order and that multiple acts may be performed in parallel. For example, the input sequence may be divided into several portions that are scanned in parallel. In addition, once a trace has been constructed, the process 300 may continue to scan the rest of the data sequence while the earlier trace is being analyzed. In both scenarios, multiple traces may be analyzed at the same time, thereby achieving an increase in speed.

Exemplary implementations of several acts of the process 300 are discussed below in connection with FIGS. 5-9. Again, it should be appreciated that these acts may be implemented in ways other than those described below, as the invention is not limited to any specific implementations.

Figure 5:
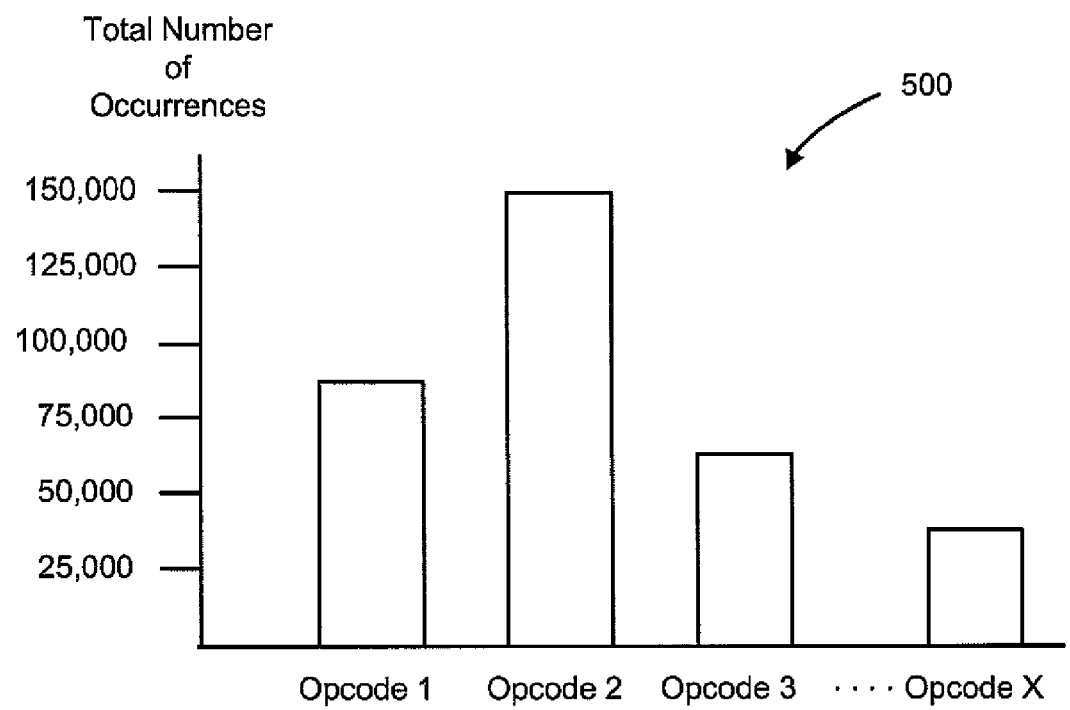
FIG. 5 illustrates an opcode prevalence histogram that may be used for determining a set of candidate opcodes to look for while scanning the data stream for malware in accordance with some embodiments.

FIG. 5 shows an example of a histogram 500 that may be used for determining a set of candidate opcodes to look for while scanning the data sequence (e.g., at act 310 in FIG. 3) to determine whether it warrants further analysis. The histogram 500 may be constructed by examining a set of executable files and counting the total number of occurrences of all opcodes 1, 2, 3, ..., X. The set of candidate opcodes may be chosen as the N most frequently occurring opcodes. In some embodiments, N may be chosen to achieve a desired tradeoff between the speed and accuracy of the malware detection analysis. For example, in some embodiments N may be chosen to be equal to fifteen, but any suitable value of N may be chosen based on the output and performance requirements, the processing power of the one or more system components that perform the analysis, etc.

The set of executable files used in constructing the histogram 500 may be chosen in any suitable way. In one embodiment, it may be a set of executable files associated with known types of malicious files. This may increase the system's effectiveness in detecting those types of malicious files. In another embodiment, a set of generic executable files may be used, so that the resulting candidate opcodes are not biased towards any particular types of exploits. This may allow the system to detect zero-day attacks more readily. In yet another embodiment, a mix of known exploits and generic files may be used to achieve a desired balance between the two approaches. However, it should be appreciated that these are merely examples, as embodiments of the invention are not limited by how the set of files used to build the histogram is chosen.

The set of executable files may be of any suitable size. Preferably, the set should be large enough to provide a representative sample of all executable files within a desired category. However, it should be appreciated that the present invention does not require a set of executable files of any particular size.

In one embodiment, the histogram may be monitored as it is being built. For example, with each additional executable file being analyzed, it is checked whether the ordered list of N most frequent opcodes in the histogram is changed due to the incorporation of the additional executable file. If no such changes are observed for five to ten consecutive files, it may be concluded that the histogram constructed thus far is a sufficiently accurate representation and that no more executable files need to be analyzed. If the analysis does not stabilize in this manner, the set of executable files may be deemed not representative of the desired category and a new set may be chosen.

In a further embodiment, a histogram may be constructed using a set of executable code extracted from known malicious files. The selection of candidate opcodes may then take into account this histogram and/or the histogram constructed using generic executable files, for example, by assigning more weight to frequent opcodes in the histogram constructed using malicious files.

In yet another embodiment, a histogram may be constructed using a set of known non-malicious files. Each byte (0x00-0xFF) may receive a negative weight based on its frequency of occurrence. For example, a larger negative weight may be assigned to a more frequent byte. These negative weights may also be taken into account when selecting candidate opcodes, so that a candidate opcode may not be one that occurs frequently in non-malicious files.

Figure 6:
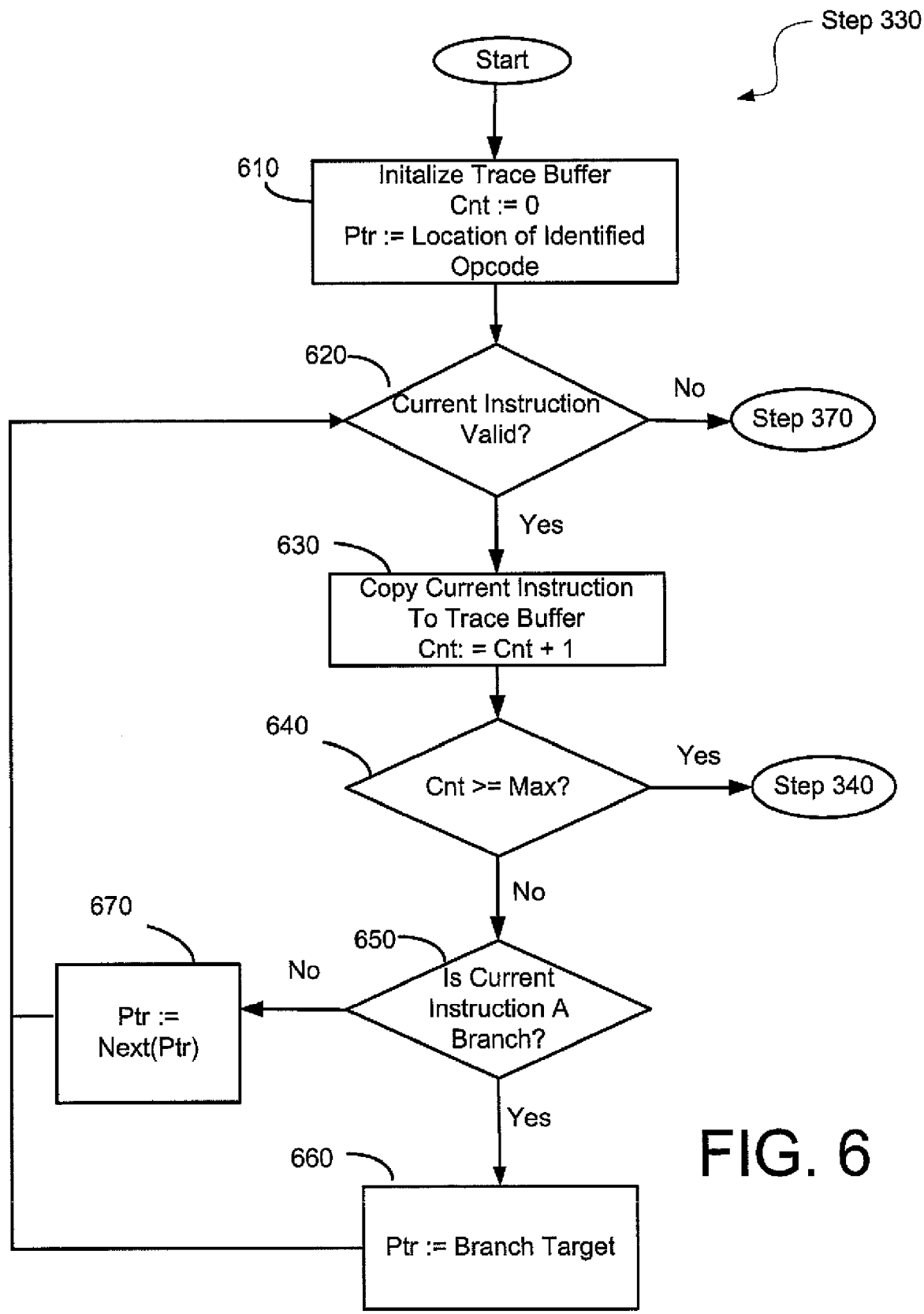
FIG. 6 illustrates an illustrative process for constructing a trace by disassembling the data set beginning at a candidate opcode in accordance with some embodiments.

FIG. 6 illustrates an exemplary implementation of a process for obtaining a trace (e.g., by disassembling the data sequence) once an opcode of interest has been identified (e.g., as discussed for act 330 in FIG. 3). In act 610, a buffer for storing the trace is initialized and a counter variable Cnt is set to zero.

In one embodiment, Cnt is used to keep track of the number of instructions that have been placed into the trace buffer, and the disassembly stops when Cnt reaches a certain maximum, Max, that may be chosen to achieve a desired tradeoff between the speed and accuracy of the analysis. For example, in one embodiment, Max may be thirty two, but any suitable number may be chosen. In addition, not all embodiments are limited to stopping the process of building a trace when a maximum number of instructions have been found, as the trace building can continue until all instructions are found or terminate in any other suitable way.

In act 610, a pointer Ptr is also initialized to point to the location of the identified opcode. In one embodiment, Ptr is used to determine a location of a next instruction to be placed in the trace buffer.

In act 620, it is determined whether the current instruction indicated by Ptr is a valid instruction. A combination of one or more rules may be used to determine whether an instruction is "valid." These rules may be chosen to reduce the probability of false positive errors (i.e., reporting a file as potentially malicious when the file does not in fact contain any malicious code). Some exemplary validation rules are listed below, but others are possible:

The opcode(s) in the instruction must conform to a relevant processor platform architecture (e.g., Intel x86-32, Intel 64, AMD64, etc.)

The opcode(s) in the instruction must be supported by the running processor platform.

The instruction must not contain a system opcode that transfers control between user mode and kernel mode. Examples of system opcodes may include interrupt 0x2E or sysenter.

The instruction must be executable in the current context. For example, it must not be a privileged instruction.

The instruction must have an acceptable number and combination of opcode prefixes.

The instruction must have an acceptable combination of extended opcode bytes.

The instruction must have an acceptable number of parameters.

Certain parameter(s) of the instruction must be within certain predetermined bounds, depending on the type of the instruction.

Any combination of the above rules and/or other suitable rules may be used to determine whether the current instruction is valid. If the instruction is determined in act 620 to be invalid, the current trace buffer is discarded and the process continues (e.g., to step 370 in FIG. 3) to identify the next candidate opcode. In this respect, in some embodiments, it is assumed that if there are not a number of valid instructions equal to the Max value, then it is unlikely that malicious code is present and that any identified opcodes resulted from coincidental matching of the data stream. However, not all embodiments are limited in this respect, and in some embodiments all traces may be analyzed regardless of how few instructions were detected, or some minimum number of instructions (e.g., smaller than Max) can be selected to determine whether the trace should be analyzed.

When it is determined at act 610 that the instruction is valid, the instruction is copied to the trace buffer and Cnt is incremented by one at act 630. Then, at act 640, it is checked if Cnt has reached Max. If so, the process moves to analyze the trace buffer (e.g., by proceeding to act 340 in FIG. 3). When it is determined that the Cnt has not reached Max, the process continues to identify the next instruction in the trace by determining, at act 650, whether the current instruction is a branch instruction, that is, an instruction that changes the control flow. Examples of branch instructions include jumps, calls and loops. If the current instruction is a branch, then in act 660 Ptr is set to the target location of the branch to retrieve the instruction at that location and the process returns to act 620. If it is determined at act 650 that the current instruction does not change the control flow, Ptr is set to the next instruction in the data sequence and the process returns to step 620 to analyze the next instruction.

Figure 7:
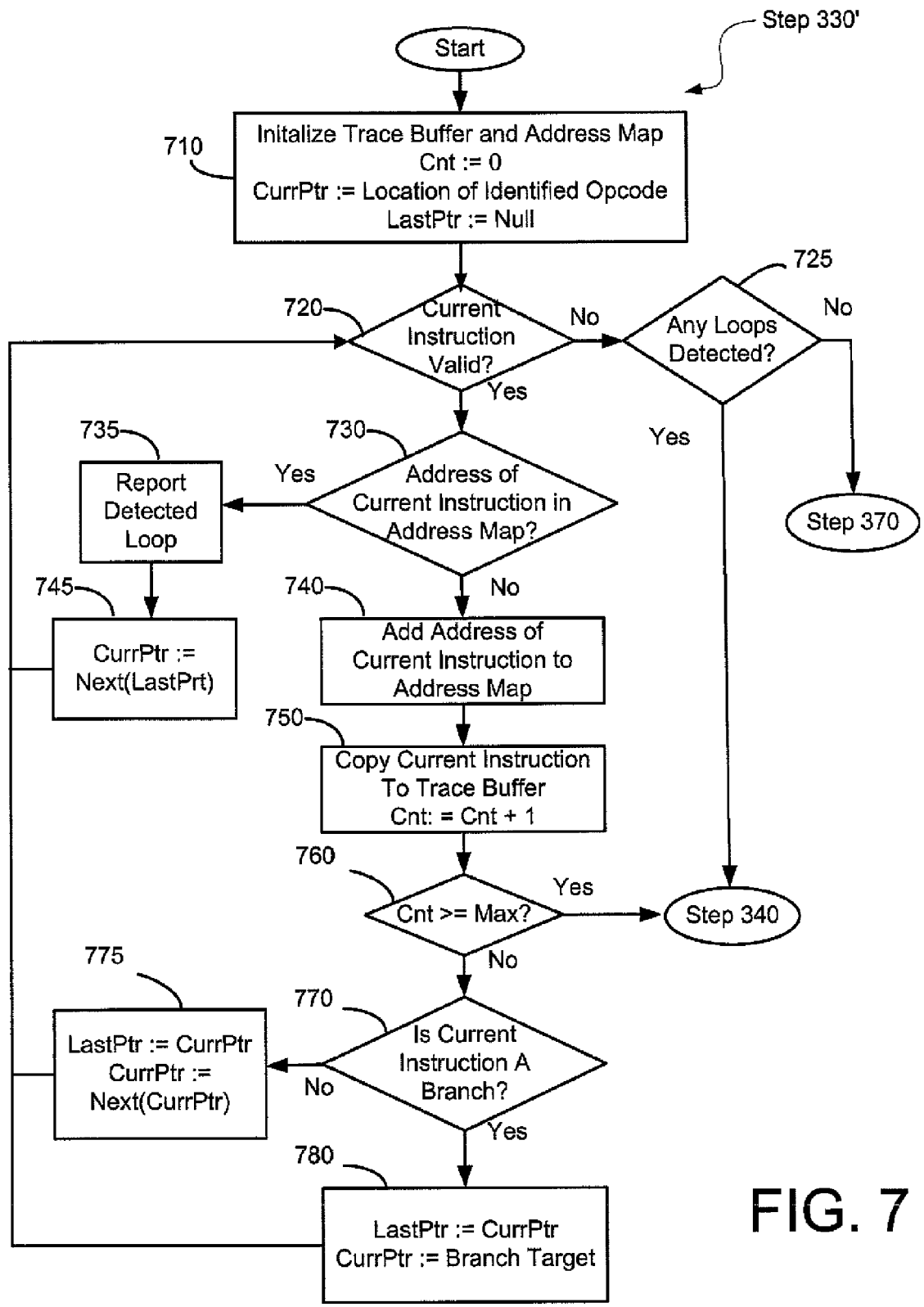
FIG. 7 illustrates a variation of the process of FIG. 6 for disassembling the data set including additional acts for detecting and handling execution loops, in accordance with some embodiments.

FIG. 7 illustrates one alternative process for disassembling a data sequence after a candidate opcode has been identified. This alternative embodiment is similar to the process of FIG. 6, but includes additional steps for detecting and handling execution loops. As discussed above, the presence of a loop may be a good indicator of the presence of malicious code, especially when arithmetic operations are performed within the loop, in which case the loop may be a decryption loop of a polymorphic attack.

As with the process in FIG. 6, a trace buffer and a variable Cnt are used keep track of the trace as it is being constructed. In addition, an address map is used to keep track of addresses that have already appeared in the trace for reasons discussed below. Two pointers, CurrPtr and LastPtr, are used respectively to point to the locations of the last instruction and the current instruction in the trace for reasons also discussed below. In act 710, the values are initialized as follows. The trace buffer is initialized, for example, by allocating an appropriate amount of memory space for storing the instructions in the trace. The address map may initialized similarly for storing the addresses of the instructions in the trace. The variable may be initialized to zero. The pointer CurrPtr may be initialized to point to the identified opcode, and the pointer LastPtr may be initialized to Null.

At act 720, it is determined whether the current instruction indicated by CurrPtr is a valid instruction. If the instruction is determined to be invalid, the process proceeds to act 725 where an additional check is performed to determine whether any loops have been detected in the trace so far. If no loops have been detected, then the current trace buffer is discarded and the process moves to identify the next candidate opcode (e.g., step 370 in FIG. 3). Otherwise, the trace buffer is kept and the process proceeds to analyze the trace buffer (e.g., at act 340 in FIG. 3). This is done because any bits following a loop may be an encrypted portion of an attack that will not be recognized as valid instructions. Therefore, the trace constructed so far may be further analyzed (e.g., at act 340 in FIG. 3) to ascertain the likelihood that it contains a decryption loop.

If at act 720 the current instruction is determined to be valid, another check is performed at act 730 to determined whether the address of the current instruction is found in the address map. A "yes" indicates the trace has looped back to a previously visited location, and the process proceeds to act 735 to report the detected loop. Then, the current pointer is set at act 745 to the next instruction in the data sequence following the last instruction that looped or branched back, rather than to the instruction following the current instruction which was looped or branched to. This is because the current instruction has already been processed when it was visited the last time, so that to prevent the analysis process from continuing to loop through the instructions it will break out of the loop by going to the next instruction consecutively following the previously processed instruction that loops back.

If at act 730 it is determined that the address of the current instruction is not in the address map, then the address is added to the address map at act 740, and the current instruction is copied to the trace buffer and Cnt is incremented by 1 at act 750. Then, at act 640, it is checked if Cnt has reached Max. If so, the process moves to analyze the trace buffer (e.g., at act 340 in FIG. 3). Otherwise, the process continues to identify the next instruction in the trace by first determining, at act 770, whether the current instruction is a branch instruction such as jump, call or loop. If the current instruction is a branch, then LastPtr is set to CurrPtr and CurrPtr is set to the target location of the branch. Otherwise, LastPtr is set to CurrPtr, and CurrPtr is set to the next instruction in the data sequence consecutively following the current instruction. The process then returns to act 720 to analyze the next instruction.

Once construction of the trace is finished (e.g., when CNT=Max or determined in any other way as discussed above), it is analyzed (e.g., at act 340 in FIG. 3). The trace may be analyzed in any suitable manner. In some embodiments, the analysis involves searching for certain patterns in the trace and assigning a numerical weight based on the presence and/or absence of these patterns. An illustrative implementation of such an embodiment will now be described in connection with FIG. 8, where a numerical weight assigned to the trace is adjusted by applying a plurality of rules. This is merely an example, as the embodiment that relates to assigning weight can be implemented in different ways (e.g., by applying different rules). The weighting rules may be chosen to maximize the accuracy of the analysis, for example, by reducing the probability of false positive errors. For instance, the weighting rules may test the presence of opcodes that typically have no use in malicious code, or opcodes whose functionalities can be achieved more compactly using equivalent constructions. The presence of such opcodes may be an indication that the trace does not contain malicious code, because malicious code is often designed to be as compact as possible.

Figure 8:
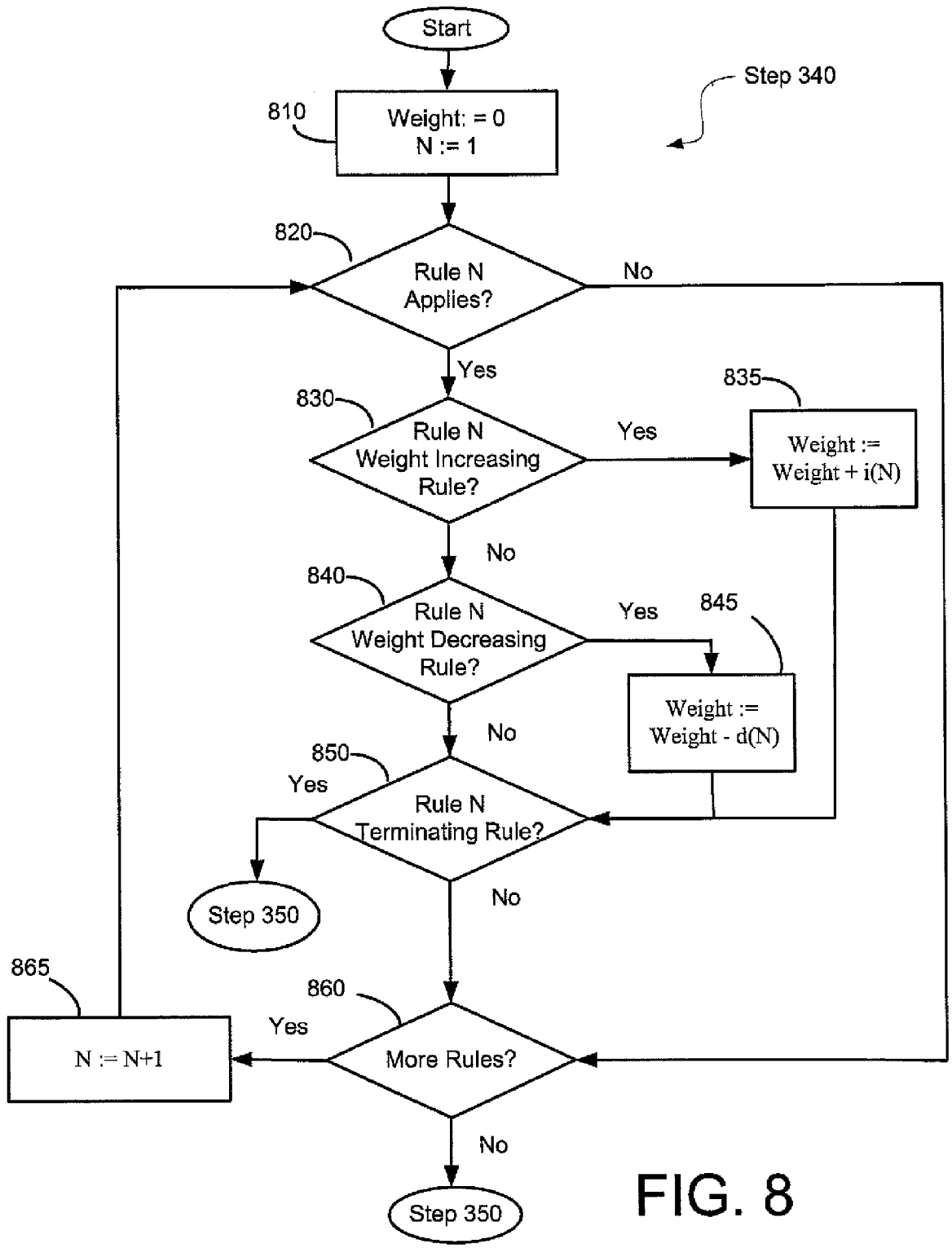
FIG. 8 illustrates an illustrative method for analyzing a trace by searching for certain patterns and assigning a numerical weight to the trace based on the presence and/or absence of these patterns in accordance with one embodiment.

In the embodiment of FIG. 8, there are three different types of rules.

Weight increasing rules: these rules may correspond to conditions under which the trace is likely to contain malicious code. For example, a weight increasing rule may check for an instruction or a sequence of instructions frequently found in malicious code embedded in data files.

Weight decreasing rules: these rules may correspond to conditions under which the trace is unlikely to contain malicious code. For example, a weight decreasing rule may check for an instruction or a sequence of instructions that is not prevalent in exploitable scenarios.

Terminating rules: these rules may correspond to conditions under which a decision may be reached without further analysis, or indicate that it no longer makes sense to continue the analysis. For example, a terminating rule may check for invalid and/or privileged instruction sequences. Terminating rules may be used to improve efficiency by identifying and skipping portions of the analysis not expected to provide useful information.

Each of the rules may be associated with a same amount of weight increase (or decrease) or differing amounts may be used in some embodiments to reflect the level of certainty with which the rule indicates the presence (or absence) of malicious code. The amount of weight increase or decrease may be obtained in any suitable manner, and in one embodiment by studying data sequences that are known to contain malicious code and data sequences that are known not to contain malicious code. For example, a rule may be applied to both clean files and malicious files to determine how reliably the rule can be used to test for the presence or absence of malicious code. A weight for the rule may then be chosen accordingly.

Some exemplary weighting rules are listed below.

A Floating Point Unit (FPU) instruction may decrease the weight. FPU instructions may make use of a processor's FPU and may each begin with an opcode in the range 0xD8-0xDF. They may be less prevalent in malicious code because their functionalities may be achieved more easily and simply using standard instructions. That is, a designer of malicious code may prefer not to use FPU instructions, so that the resulting malicious code is as small as possible.

A MultiMedia eXtensions (MMX) instruction may decrease the weight. Similar to the FPU instructions discussed above, the presence of MMX instructions may be an indicator of non-maliciousness because their use may increase the size of the malicious code. In one embodiment, a table of MMX instructions may be used to detect an MMX instruction. This table may list legal MMX instructions and their ranges and may be constructed based on documentations released by the relevant chip providers. The table may also be updated as new instructions are introduced and/or existing instructions are altered and/or removed.

A Streaming Single Instruction Multiple Data Extensions (SSE) instruction may decrease the weight. Similar to the FPU instructions discussed above, the presence of SSE instructions may be an indicator of non-maliciousness because their use may increase the size of the malicious code. A table of legal SSE constructed based on chip provider documentations may also be used to detect an SSE instruction.

A Generating an interrupt with the parameter 0x2E may increase the weight. Interrupt 0x2E may be an interface between user mode and kernel mode and may be used to allow an application to call operating system functions directly, rather than via documented Application Programming Interfaces (APIs). This technique is known to be used in some malicious code.

Generating an interrupt with a parameter other than 0x2E may decrease the weight. These interrupt instructions may be less prevalent in malicious code because they target areas of operating system functionality that may not be useful in malicious code, such as functionalities relating to user interfaces for displaying messages and/or moving windows.

Three consecutive displacements of three consecutive instructions may increase the weight. This pattern may be part of a technique for decoding malicious code that is encoded or encrypted. For example, the following instruction sequence exhibits a pattern of consecutive displacements (denoted by "+") and may be used to decode malicious code designed to appear as printable characters (e.g., from the alphabet A-Z and a-z and the numbers 0-9). In this example, the sequence itself also consists of entirely printable characters.

```
IMUL EAX, DWORD PTR DS:[ESI*2 + ECX + 65], + 30
XOR AL, BYTE PTR DS:[ESI*2 + ECX + 66]
XOR BYTE PTR DS:[ESI + ECX + 41], AL
```

The use of FS:[30] or FS:[0] in arithmetic or data move instructions may increase the weight. FS:[30] or FS:[0] may represent special memory locations that can be used to perform suspicious actions, such as determining the memory location of some executable code, and/or locating system files so that operating system functions may be called.

A detected loop may increase the weight. As discussed earlier, a loop may indicate the presence of a decryption engine for decrypting malicious code.

Arithmetic instructions (such as ADD, SUB or XOR) inside a detected loop may further indicate the presence of a decryption engine and therefore may increase the weight.

A call/pop instruction sequence may increase the weight. This pattern may be part of a technique for determining the memory location of malicious code. An example of a call/pop sequence is as follows.

```
L1:    call L2
L2:    pop eax
```

The call instruction in this sequence may store in a special memory location the address of L2 in memory, and the pop instruction may retrieve that value and store it in the register eax for later use.

A jmp/call instruction sequence may increase the weight. This pattern may be part of a technique for executing code in a restricted character-set environment, which may be suspicious. An example of a jmp/call sequence is as follows, as part of a jmp/call/pop sequence.

```
L1:    jmp L3
L2:    jmp L4
L3:    call L2
L4:    pop eax
```

This sequence contains a jump forward to L3 and then a call backward to L2, so that, when encoded, the sequence contains no zeros. As a result of executing this sequence, the register eax holds the memory location of L4.

A cmp/jcc instruction sequence may increase the weight, where jcc may represent any branch instruction. This pattern may also indicate the presence of a decryption engine. For example, it may be used to check if a register contains the memory location of the end of the malicious code, or if a counter has reached zero.

A push/pop instruction sequence may increase the weight. This pattern may be used in a variation of the jmp/call sequence discussed above. Also, because push and pop instructions are printable characters, a push/pop sequence be used in malicious code designed to appear as printable characters.

A sequence of push instructions followed by a call instruction may increase the weight. This pattern may indicate the presence of malicious code that attempts to call an operating system API. For example, the sequence below may cause the program "cmd" (which may be a command prompt) to run.

```
push "dmc"
mov ecx, esp
push 0
call WinExec
```

A nop sled (i.e., a sequence of instructions with no purpose other than to slide the execution towards more meaningful code) may increase the weight. Due to, for example, differences in the versions of a targeted application, an attacker may not be able to reliably predict which portion of the malicious code is actually executed. For example, execution may begin in the middle of the malicious code, skipping over an initial portion. To prevent this situation, an attacker may prepend the malicious code with a nop sled (e.g., consisting of single-byte instructions), so that the malicious code may be executed in its entirety as long as execution begins somewhere in the nop sled.

A return from function (ret) instruction may increase the weight. This pattern may be used in a variation of the jmp/call sequence discussed above. For example, the following sequence may be used instead of the jmp/jmp/call/pop sequence above.

```
L1: jmp L3
L2: pop eax
    push eax
    ret
L3: call L2
```

In some embodiments, this rule may look for a ret instruction in conjunction with some meaningful code such as those shown above, so as to reduce false positive errors. This rule may also be a terminating rule.

It should be appreciated that the foregoing list of weighting rules is provided merely as an example. Any suitable combination of these and other rules may be used to determine the weight of a trace. For instance, the combination may be chosen to improve accuracy in detecting a particular class of attacks. Alternatively, the combination may be chosen in a way that is not biased towards any particular classes of attacks, so that the system may be better suited for detecting unknown or zero-day attacks.

Referring to FIG. 8, the weight of a trace may be initialized to zero and the weighting rules may be indexed and applied one at a time to adjust the weight up or down. At act 810, the weight is set to zero and a variable N is set to 1, where N represents the index of a rule. At act 820, rule N is applied to the trace. If rule N is not matched, then the process proceeds to act 860 to determine if there axe more rules to be applied. If rule N is matched, then it is determined at act 830 whether rule N is a weight increasing rule. If so, the weight is increased by an amount i(N) at act 835, where i(N) represents the weighting increase for the rule N. Otherwise, it is determined at act 840 whether rule N is a weight decreasing rule. If so, the weight is decreased by an amount d(N) at act 845, where d(N) represents the weighting decrease for the rule N. As discussed above, the value i(N) or d(N) may be determined via experimentation with clean files and/or malicious files, or in any other suitable way.

At act 850, it is determined whether rule N is a terminating rule. If so, the process proceeds (e.g., to act 350 in FIG. 3) to determine whether the trace is potentially malicious. If it is determined in act 850 that the rule is not a terminating rule, the process proceeds to act 860 where it is determined whether there are more rules to consider and, if so, N is incremented by one and the process returns to act 820 to apply the next rule. When there are no more rules to consider, the process proceeds (e.g., to act 350 in FIG. 3) to determine whether the trace is potentially malicious.

Figure 9:
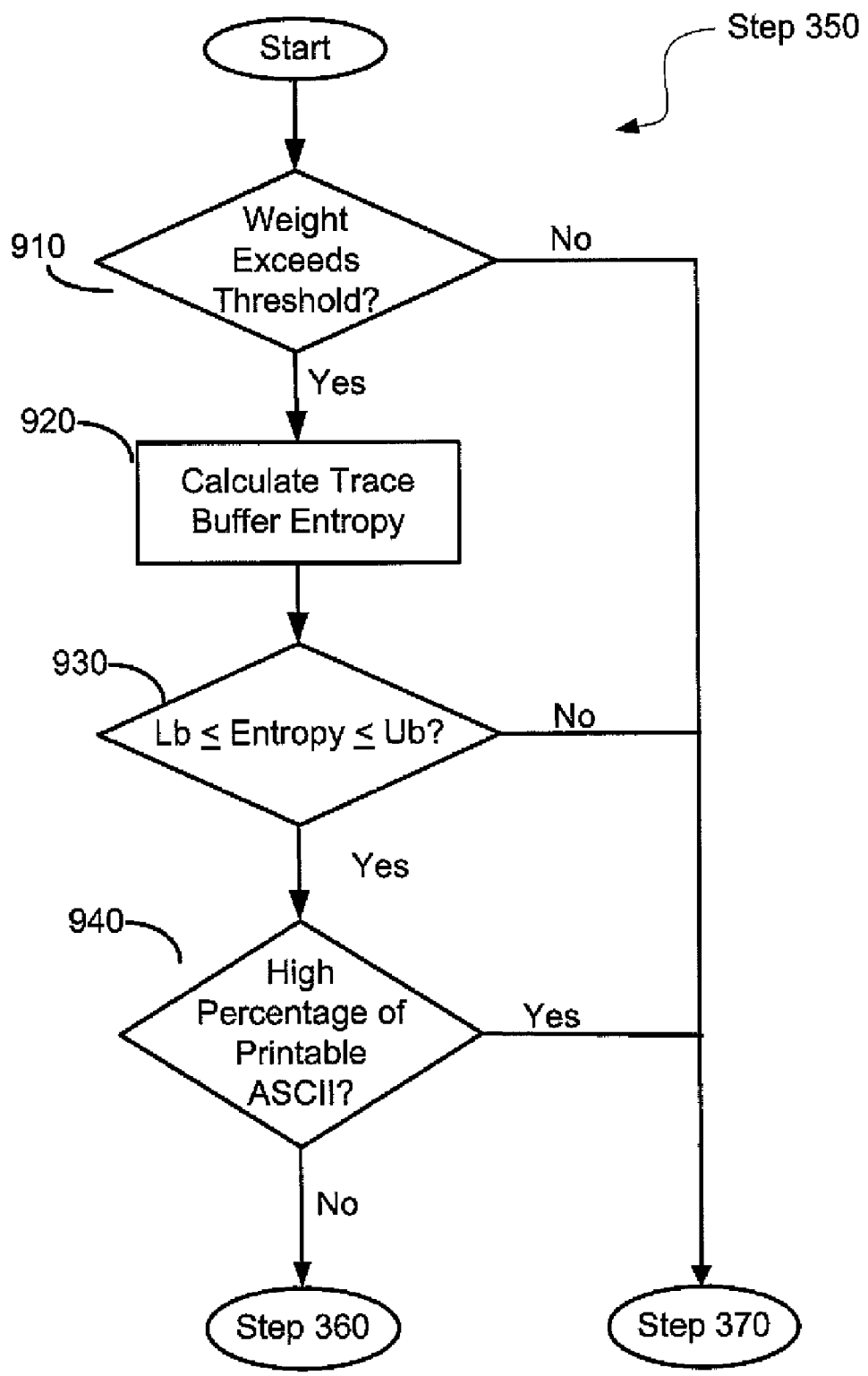
FIG. 9 illustrates an illustrative method for determining whether the trace being analyzed contains potentially malicious code in accordance with one embodiment.

FIG. 9 illustrates one illustrative method for determining whether a trace is potentially malicious (e.g., act 350 in FIG. 3). Of course, determining whether a trace is malicious can be done in any of numerous ways and FIG. 9 is just one illustrative non-limiting example. At act 910, it is determined whether the weight of the trace exceeds a certain threshold. The threshold can be determined in any suitable manner, as the invention is not limited in this respect. For example, as with the weight adjustments, this threshold may be determined by experimentation using clean files and malicious files. Multiple choices for the threshold may be tested to select one that best fits a particular set of malware detection requirements.

If the weight does not exceed the threshold, then the trace is determined to not be malicious and the trace buffer is discarded. The process may then terminate if it is a stand-alone process for analyzing a trace, or may proceed to other aspects of a larger process (e.g., to act 370 in FIG. 3 to determine whether the end of the data sequence has been reached). When it is determined that the weight exceeds the threshold, an entropy value is optionally calculated for the trace buffer at act 920. Entropy is a measure of randomness in a bit string, and may be computed in different ways to measure different aspects of randomness. In one embodiment, the entropy may be a value between zero and seven, where a constant string (e.g., all zeros) may have an entropy of zero and a random string may have an entropy of seven.

At act 930, it is determined whether the entropy of the trace buffer is within certain bounds, for example, greater than lower bound Lb and smaller than upper bound Ub. The lower and upper bounds may be chosen in any suitable manner. In one embodiment, they are chosen based on experimental data and to improve accuracy of the analysis. In one embodiment, the lower bound may be three and the upper bound may be five. However, other suitable bounds may be also be used, as the embodiments of the invention that use entropy analysis are not limited in this respect.

If the entropy value of the trace buffer falls outside the bounds, then the trace is determined to not be malicious and the trace buffer is discarded. The process may then terminate or proceed to other acts in a larger process (e.g., act 370 in FIG. 3 to determine whether the end of the data sequence has been reached).

When it is determined at act 930 that the entropy is within bounds, the process optionally proceeds to act 940 where it is determined whether the trace buffer contains a high percentage of printable ASCII characters, which may indicate that the collection of data being analyzed contains text data and is not malicious. For example, if more than 85% of the bytes in the trace buffer are encodings of printable ASCII characters, then the trace is determined to not be malicious. In that case, the trace buffer is discarded and the process terminates or continues to another portion of a higher level process (e.g., to act 370 in FIG. 3).

When it is determined at act 940 that the trace does not have a high percentage of printable ASCII, it indicates that the file is potentially malicious. The process may proceed in any suitable manner, including by ensuring (e.g., itself or by communicating with other system components) that the file is not accessed and/or that notification is provided that the file is potentially malicious (e.g., via act 360 in FIG. 3).

Figure 10:
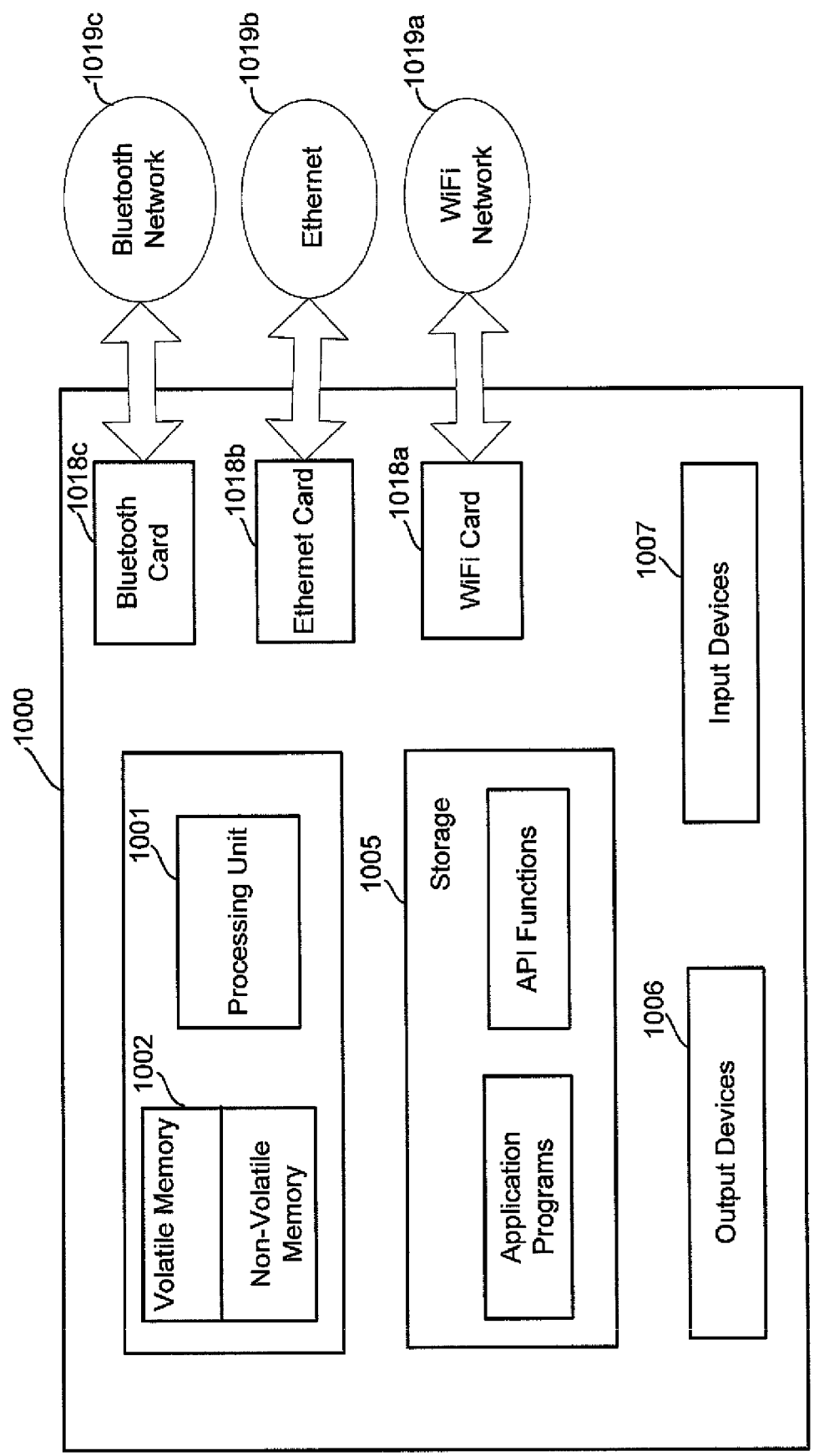
FIG. 10 is a schematic depiction of an illustrative computer, on which aspects of the invention may be implemented.

The aspects of the present invention described herein can be used with any one or more computers and/or devices each having one or more processors that may be programmed to take any of the actions described above for detecting malware in data sequences. FIG. 10 is a schematic illustration of an exemplary computer 1000 on which aspects of the present invention may be implemented. The computer 1000 includes a processor or processing unit 1001 and a memory 1002 that can include both volatile and non-volatile memory. The computer 1000 also includes storage 1005 (e.g., one or more disk drives) in addition to the system memory 1002. The memory 1002 can store one or more instructions to program the processing unit 1001 to perform any of the functions described herein. As mentioned above, the reference herein to a computer can include any device having a programmed processor, including a rack-mounted computer, a desktop computer, a laptop computer, a tablet computer or any of numerous devices that may not generally be regarded as a computer, which include a programmed processor (e.g., a PDA, an MP3 Player, a mobile telephone, wireless headphones, etc.).

The computer may have one or more input and output devices, such as devices 1006 and 1007 illustrated in FIG. 10. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Computer 1000 may also comprise network interface cards (e.g., 1018*a-c*) to enable communication via various networks (e.g., 1019*a-c*). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art. Such alterations, modifications, and improvements are intended to be within the spirit and scope of the invention. Accordingly, the foregoing description and drawings are by way of example only.

The above-described embodiments of the invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the invention may be used alone, in combination, or in a variety of arrangements not specifically discussed in the embodiments described in the foregoing and is therefore not limited in its application to the details and arrangement of components set forth in the foregoing description or illustrated in the drawings, For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. At a computer system, a method for determining whether a data file not expected to include executable code is suspected of containing malicious executable code, the method comprising:

accessing a data file, the data file indicated to be of a data type associated with an application, data files of the data type not expected to include machine-executable code;

detecting a possibility that the data file includes machine-executable code by identifying that a portion of the data file corresponds to a bit pattern for at least one candidate machine-executable opcode;

determining that the data file warrants further analysis based on detecting the possibility that the data file includes machine-executable code; and subsequent and in response to detecting the possibility that the data file includes machine-executable code, analyzing the data file further to determine if the possible machine-executable code is malicious executable code, including:

disassembling the data file to obtain a sequence of possible machine-executable instructions comprising an initial instruction and at least one subsequent instruction, wherein the initial instruction comprises the candidate machine-executable opcode;

analyzing a control flow of the sequence of possible instructions;

using at least one processor to record a plurality of locations in an address map stored in at least one computer-readable medium, each location in the plurality of locations corresponding to at least one of the possible instructions in the sequence;

determining whether the sequence of possible instructions comprises an execution loop by determining whether the control flow of the sequence of possible instructions returns to any location recorded in the address map; and determining whether the data file is suspected of containing malicious executable code based, at least in part, on the determination of whether the sequence of possible instructions comprises an execution loop.

2. The method of claim 1, wherein the sequence of possible instructions comprises a first possible instruction, and wherein analyzing the control flow comprises, for the first possible instruction, determining a location of a next possible instruction in the sequence of possible instructions at least in part by analyzing the first possible instruction.

3. The method of claim 2, wherein analyzing the control flow further comprises:

when the first possible instruction is a branch instruction, analyzing as the next possible instruction a target of the branch instruction; and when the first possible instruction is not a branch instruction, analyzing as the next possible instruction a possible instruction consecutively following the first possible instruction in the data file.

4. The method of claim 1, further comprising:

assigning a weight to the sequence of possible instructions, the weight indicative of a level of suspiciousness of whether the sequence of possible instructions comprises malicious executable code; and wherein determining whether the data file is suspected of containing executable code further comprises determining whether the weight exceeds a threshold.

5. The method of claim 4, further comprising:

making a first adjustment to the weight based on a presence or absence of a first pattern of one or more instructions in the sequence of possible instructions; and making a second adjustment to the weight based on a presence or absence of a second pattern of one or more instructions in the sequence of possible instructions.

6. The method of claim 1, wherein identifying the at least one candidate opcode comprises determining whether the data file comprises at least one opcode that has been determined to occur frequently in at least one sample set of executable code.

7. The method of claim 1, further comprising determining whether a first instruction in the sequence of possible instructions is valid, wherein a first location corresponding to the first instruction is recorded in the address map only if it is determined that the first instruction is valid.

8. At least one computer storage memory device encoded with a plurality of instructions that, when executed, perform a method for determining whether a data file not expected to include executable code is suspected of containing malicious executable code, the method comprising:

accessing a data file, the data file indicated to be of a data type associated with an application, data files of the data type not expected to include machine-executable code;

detecting a possibility that the data file includes machine-executable code by identifying that a portion of the data file corresponds to a bit pattern for at least one candidate machine-executable opcode;

determining that the data file warrants further analysis based on detecting the possibility that the data file includes machine-executable code; and subsequent and in response to detecting the possibility that the data file includes machine-executable code, analyzing the data file further to determine if the possible machine-executable code is malicious executable code, including:

disassembling the data file to obtain a sequence of possible instructions;

making a determination of whether the sequence of possible instructions comprises an execution loop, wherein making the determination comprises recording a plurality of locations in an address map, each location in the plurality of locations corresponding to at least one of the possible instructions in the sequence, and determining whether a control flow of the sequence of possible instructions returns to any location recorded in the address map; and determining whether the data file is suspected of containing malicious executable code based, at least partially, on the determination of whether the possible instructions comprises an execution loop.

9. The at least one computer storage memory device of claim 8, wherein:

identifying that a portion of the data file corresponds to a bit pattern for at least one candidate opcode comprises determining the at least one opcode frequently occurs in at least one sample set of executable code, and wherein an initial instruction of the sequence of possible instructions comprises the at least one candidate opcode.

10. The at least one computer storage memory device of claim 8, wherein the sequence of possible instructions comprises a first possible instruction, and wherein analyzing the control flow comprises:

when the first possible instruction is a branch instruction, analyzing as the next possible instruction a target of the branch instruction; and when the first possible instruction is not a branch instruction, analyzing as the next possible instruction a possible instruction consecutively following the first possible instruction in the data file.

11. The at least one computer storage memory device of claim 8, wherein the method further comprises:

computing an entropy of the sequence of possible instructions as a sequence of bits; and identifying the sequence of possible instructions as being suspicious only when the entropy is within a predetermined range.

12. The at least one computer storage memory device of claim 8, wherein the method further comprises:

assigning a weight to the sequence of possible instructions, the weight indicative of a level of suspiciousness of whether the sequence of possible instructions comprises malicious executable code; and wherein determining whether the data file is suspected of containing malicious executable code comprises determining whether the weight exceeds a threshold.

13. The at least one computer storage memory device of claim 12, wherein the method further comprises:

making a first adjustment to the weight based on a presence or absence of a first pattern of one or more instructions in the sequence of possible instructions; and making a second adjustment to the weight based on a presence or absence of a second pattern of one or more instructions in the sequence of possible instructions.

14. The at least one computer storage memory device of claim 8, wherein the method further comprises determining whether a first instruction in the sequence of possible instructions is valid, wherein a first location corresponding to the first instruction is recorded in the address map only if it is determined that the first instruction is valid.

15. An apparatus comprising:
at least one processor programmed to determine whether a data file not expected to include executable code is suspected of containing malicious executable code by:
accessing a data file, the data file indicated to be of a data type associated with an application, data files of the data type not expected to include machine-executable code;
detecting a possibility that the data file includes machine-executable code by identifying that a portion of the data file corresponds to a bit pattern for at least one candidate machine-executable opcode;
determining that the data file warrants further analysis based on detecting the possibility that the data file includes machine-executable code; and
subsequent and in response to detecting the possibility that the data file includes machine-executable code, analyzing the data file further to determine if the possible machine-executable code is malicious executable code, including:
disassembling the data file to obtain a sequence of possible instructions;
making a determination of whether the sequence of possible instructions comprises an execution loop, wherein making the determination comprises recording a plurality of locations in an address map, each location in the plurality of locations corresponding to at least one of the possible instructions in the sequence, and determining whether a control flow of the sequence of possible instructions returns to any location recorded in the address map; and
determining whether the data file is suspected of containing malicious executable code based, at least partially, on the determination of whether the sequence of possible instructions comprises an execution loop.

16. The apparatus of claim 15, wherein the sequence of possible instructions comprises a first possible instruction, and wherein the at least one processor is further programmed to analyze the control flow by, for the first possible instruction, determining a location of a next possible instruction in the sequence of possible instructions at least in part by analyzing the first possible instruction.

17. The apparatus of claim 16, wherein the at least one processor is further programmed to analyze the control flow by:
when the first possible instruction is a branch instruction, analyzing as the next possible instruction a target of the branch instruction; and
when the first possible instruction is not a branch instruction, analyzing as the next possible instruction a possible instruction consecutively following the first possible instruction in the data file.

18. The apparatus of claim 15, wherein the at least one processor is further programmed to:
assign a weight to the sequence of possible instructions, the weight indicative of a level of suspiciousness of the sequence of possible instructions; and
determine whether the data file is suspected of containing malicious executable code by determining whether the weight exceeds a threshold.

19. The apparatus of claim 18, wherein the at least one processor is further programmed to:
make a first adjustment to the weight based on a presence or absence of a first pattern of one or more instructions in the sequence of possible instructions; and
make a second adjustment to the weight based on a presence or absence of a second pattern of one or more instructions in the sequence of possible instructions.

* * * * *